(12) United States Patent
Ryu et al.

(10) Patent No.: US 12,108,420 B2
(45) Date of Patent: Oct. 1, 2024

(54) ELECTRONIC DEVICE FOR DIRECT COMMUNICATION WITH EXTERNAL ELECTRONIC DEVICE AND OPERATING METHOD THEREOF

(71) Applicant: Samsung Electronics Co., Ltd., Gyeonggi-do (KR)

(72) Inventors: Jinbong Ryu, Gyeonggi-do (KR); Hyeongjin Kim, Gyeonggi-do (KR); Jongmoon Park, Gyeonggi-do (KR); Seongha Lee, Gyeonggi-do (KR); Seoyeon Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 388 days.

(21) Appl. No.: 17/508,537

(22) Filed: Oct. 22, 2021

(65) Prior Publication Data

US 2022/0095297 A1    Mar. 24, 2022

Related U.S. Application Data

(63) Continuation of application No. PCT/KR2021/011348, filed on Aug. 25, 2021.

(30) Foreign Application Priority Data

Sep. 24, 2020   (KR) .................. 10-2020-0123557

(51) Int. Cl.
*H04W 72/51*    (2023.01)
*H04W 76/14*    (2018.01)
(Continued)

(52) U.S. Cl.
CPC .......... *H04W 72/51* (2023.01); *H04W 76/14* (2018.02); *H04W 76/15* (2018.02); *H04W 84/12* (2013.01); *H04W 88/06* (2013.01)

(58) Field of Classification Search
CPC ..... H04W 72/51; H04W 76/15; H04W 76/14; H04W 84/12; H04W 88/06
See application file for complete search history.

(56) References Cited

U.S. PATENT DOCUMENTS 10,075,517 B2    9/2018  Kim et al.
10,547,555 B2 *  1/2020  Lee ...................... H04W 48/18
(Continued)

FOREIGN PATENT DOCUMENTS

JP    2013-516901    5/2013
KR    10-1045321     6/2011
(Continued)

OTHER PUBLICATIONS

International Search Report dated Dec. 1, 2021 issued in counterpart application No. PCT/KR2021/011348, 16 pages.
(Continued)

*Primary Examiner* — Chandrahas B Patel
(74) *Attorney, Agent, or Firm* — The Farrell Law Firm, P.C.

(57) ABSTRACT

Disclosed is an electronic device including a wireless communication circuit, and a processor operably connected to the wireless communication circuit, wherein the processor is configured to identify a first channel for communication with an access point (AP) based on wireless fidelity (Wi-Fi) and a second channel for direct communication with an external electronic device based on Wi-Fi direct, reconfigure a capability of the electronic device related to direct communication with the external electronic device when the first channel and the second channel are different, and transmit information about the reconfigured capability of the electronic device to the external electronic device through the wireless communication circuit.

20 Claims, 11 Drawing Sheets

(51) Int. Cl.
*H04W 76/15* (2018.01)
*H04W 84/12* (2009.01)
*H04W 88/06* (2009.01)

(56) References Cited

U.S. PATENT DOCUMENTS

| | | | |
|---|---|---|---|
| 10,743,358 B1* | 8/2020 | Mullati | H04W 88/06 |
| 2011/0173331 A1 | 7/2011 | Setton et al. | |
| 2012/0314770 A1 | 12/2012 | Kim et al. | |
| 2015/0092737 A1 | 4/2015 | Damodaran | |
| 2017/0249919 A1 | 8/2017 | Bae et al. | |
| 2018/0048701 A1 | 2/2018 | Iwami et al. | |
| 2018/0249111 A1 | 8/2018 | Kim et al. | |
| 2019/0238939 A1 | 8/2019 | Kwon et al. | |
| 2019/0261440 A1* | 8/2019 | Lim | H04W 76/14 |
| 2020/0120453 A1 | 4/2020 | Kim et al. | |
| 2020/0296793 A1 | 9/2020 | Cheong et al. | |

FOREIGN PATENT DOCUMENTS

| | | |
|---|---|---|
| KR | 1020170100968 | 9/2017 |
| KR | 10-1805622 | 11/2017 |
| KR | 1020180099267 | 9/2018 |
| KR | 1020200041662 | 4/2020 |
| KR | 1020200110086 | 9/2020 |

OTHER PUBLICATIONS

European Search Report dated Jul. 25, 2023 issued in counterpart application No. 21872737.8-1213, 7 pages.
European Search Report dated May 31, 2024 issued in counterpart application No. 21872737.8-1206, 5 pages.

* cited by examiner

ELECTRONIC DEVICE FOR DIRECT COMMUNICATION WITH EXTERNAL ELECTRONIC DEVICE AND OPERATING METHOD THEREOF

CROSS-REFERENCE TO RELATED APPLICATIONS

This application is a Bypass Continuation Application of International Application No. PCT/KR2021/011348, which was filed on Aug. 25, 2021, and is based on and claims priority under 35 U.S.C. § 119 to Korean Patent Application No. 10-2020-0123557, filed on Sep. 24, 2020, in the Korean Intellectual Property Office, the entire disclosure of each of which is incorporated herein by reference herein in its entirety.

BACKGROUND

1. Field

The disclosure relates generally to an electronic device, and more particularly, to an apparatus and method for direct communication between an electronic device and an external electronic device.

2. Description of Related Art

Wireless Fidelity (Wi-Fi) Direct provides a peer-to-peer (P2P) protocol connection scheme for establishing direct communication between electronic devices supporting Wi-Fi without network infrastructure equipment (e.g., access point (AP), hotspot, or router).

Wi-Fi Direct may be embedded in various electronic devices such as smartphones, televisions (TVs), laptop computers, cameras, printers and game consoles, and may support direct communication between the electronic devices.

An electronic device may share content such as photographs, moving images, and games through direct communication using Wi-Fi Direct with an external electronic device. The electronic device may receive mirroring data (e.g., image and/or audio) from the external electronic device through Miracast™ based on Wi-Fi Direct technology.

The electronic device may transmit and/or receive data to and/or from an AP based on Wi-Fi through a wireless connection with the AP while performing direct communication with the external electronic device through the Wi-Fi Direct technology. For example, if the channel for wireless connection with the AP and the channel for direct communication with the external electronic device are identical, the electronic device may transmit and/or receive data to and/or from the external electronic device and/or the AP by using the same channel.

However, if the channel for wireless connection with the AP and the channel for direct communication with the external electronic device are different, the electronic device cannot transmit and/or receive data to and/or from the external electronic device and the AP concurrently. When the electronic device provides a low latency service such as real-time screen transmission through direct communication with the external electronic device, due to communication with the AP, the quality of a screen transmitted and/or received in real time to and/or from the external electronic device may be deteriorated or an uneven picture on the screen may be produced.

As such, there is a need in the art for a method and apparatus that mitigate disruptions to the screen quality during WiFi Direct communication.

SUMMARY

The disclosure has been made to address at least the above-mentioned problems and/or disadvantages and to provide at least the advantages described below.

Accordingly, an aspect of the disclosure is to provide an apparatus and method that, when an electronic device supports direct communication with an external electronic device based on Wi-Fi Direct and a wireless connection with an AP based on Wi-Fi, can provide direct communication between the electronic device and the external electronic device in a stable manner.

Another aspect of the disclosure is to provide an electronic device in which, when a first channel for wireless connection with an AP based on Wi-Fi is different from a second channel for direct communication with an external electronic device based on Wi-Fi Direct, the electronic device may set or reset variables related to direct communication with the external electronic device to thereby continuously provide a low-latency service through direct communication with the external electronic device.

According to an aspect of the disclosure, an electronic device may include a wireless communication circuit, and a processor operably connected to the wireless communication circuit, wherein the processor is configured to identify a first channel for communication with an AP based on Wi-Fi and a second channel for direct communication with an external electronic device based on Wi-Fi direct, reconfigure a capability of the electronic device related to direct communication with the external electronic device when the first channel and the second channel are different, and transmit information about the reconfigured capability of the electronic device to the external electronic device through the wireless communication circuit.

According to another aspect of the disclosure, a method of the electronic device may include identifying a first channel for communication with an AP based on Wi-Fi and a second channel for direct communication with an external electronic device based on Wi-Fi direct, reconfiguring a capability of the electronic device related to direct communication with the external electronic device when the first channel and the second channel are different, and transmitting information about the reconfigured capability of the electronic device to the external electronic device.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
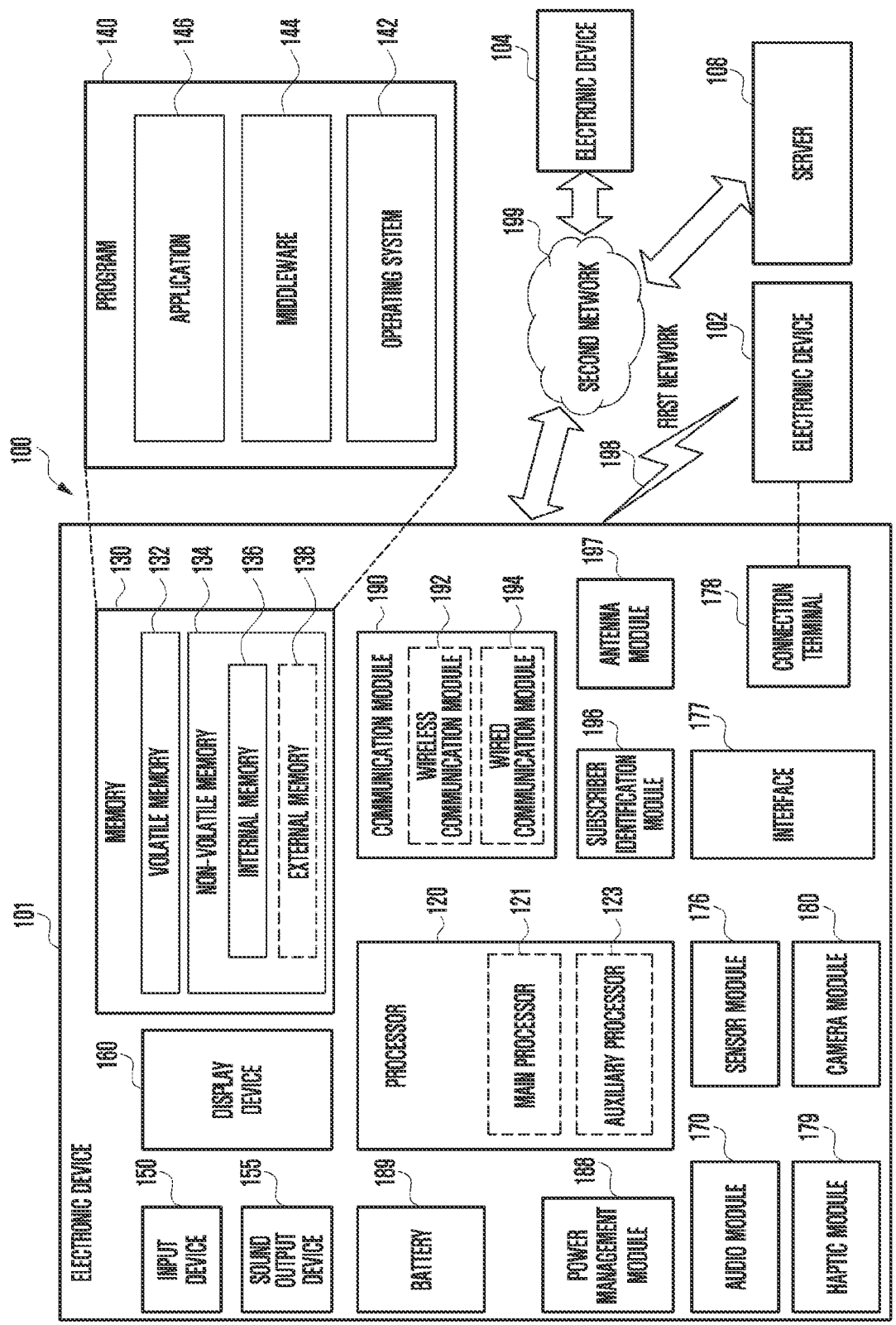
FIG. 1 illustrates an electronic device in a network environment according to an embodiment.

Hereinafter, various embodiments will be described in detail with reference to attached drawings. In the disclosure, embodiments are described in the drawings and a related detailed description is set forth, but this is not intended to limit the embodiments of the disclosure. Descriptions of well-known functions and constructions are omitted for the sake of clarity and conciseness.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). The electronic device 101 may communicate with the electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. When the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123. The auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module).

A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module

197 may include an antenna including a radiating element composed of a conductive material or a conductive pattern formed in or on a substrate (e.g., a printed circuit board (PCB)). The antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

The antenna module 197 may form a mmWave antenna module. The mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. The external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, The module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, The integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
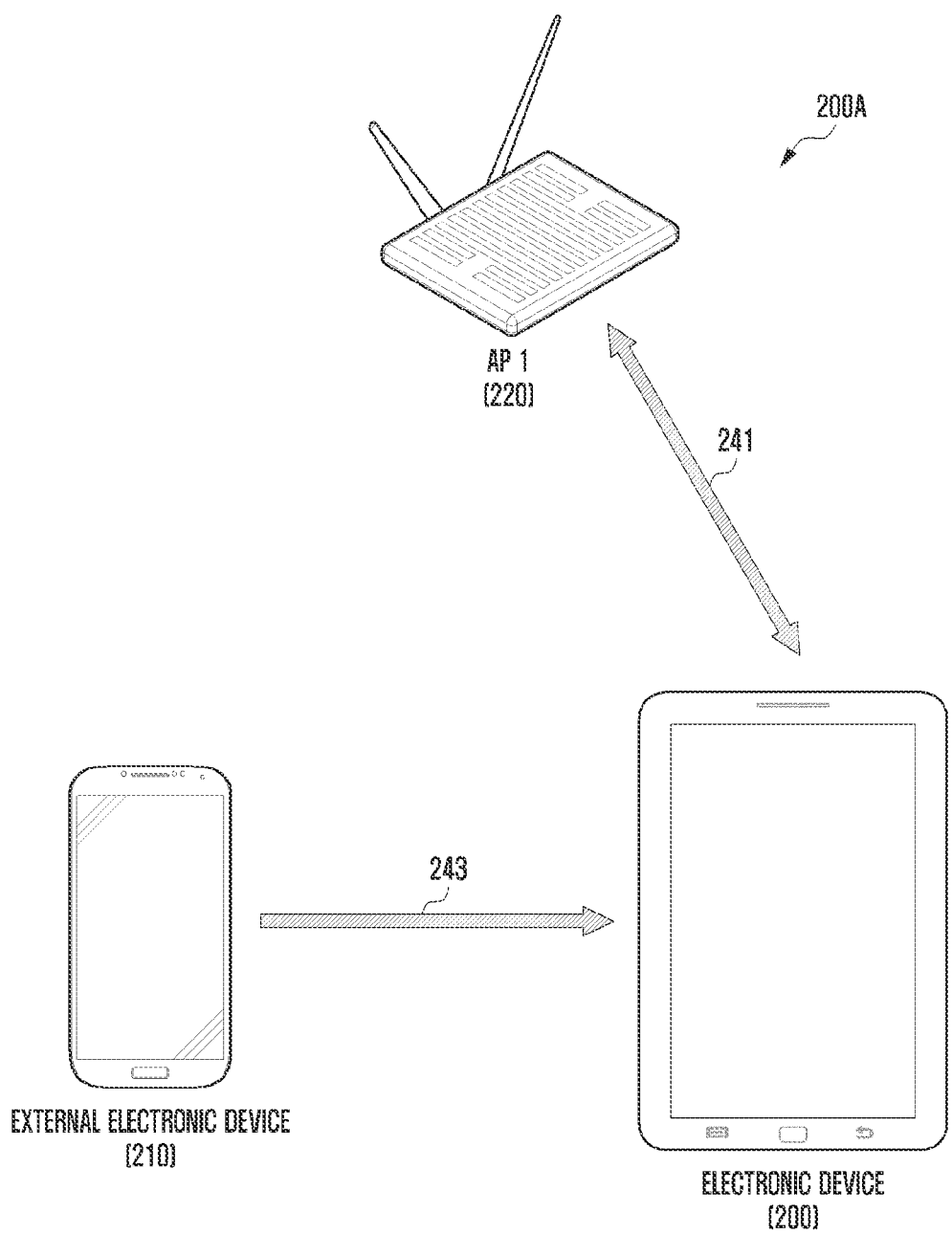
FIG. 2A illustrates a wireless communication system that provides a network of direct communication with an external electronic device and/or wireless communication with an AP according to an embodiment.
Figure 2B:
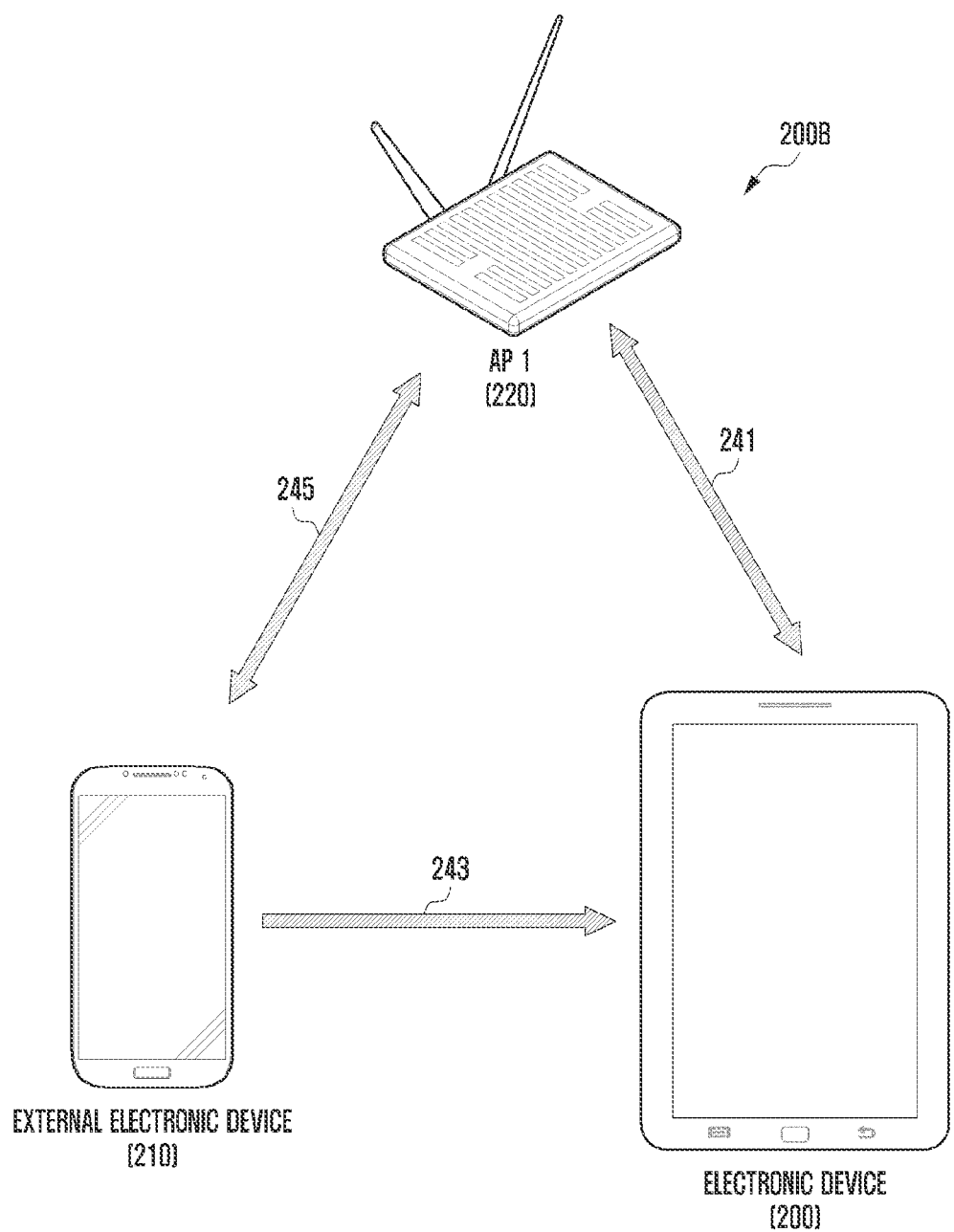
FIG. 2B illustrates a wireless communication system that provides a network of direct communication with an external electronic device and/or wireless communication with an AP according to an embodiment.
Figure 2C:
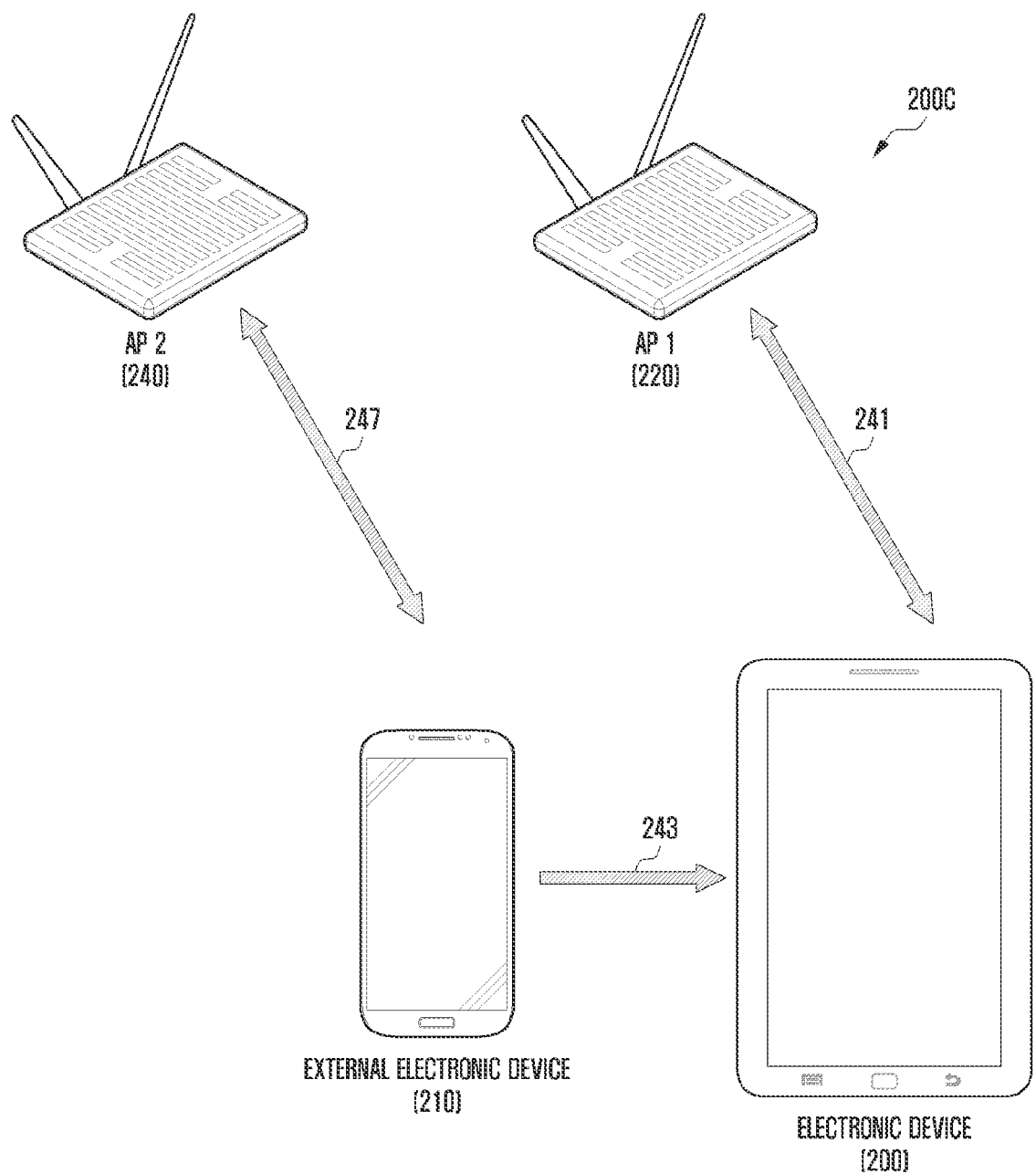
FIG. 2C illustrates a wireless communication system that provides a network of direct communication with an external electronic device and/or wireless communication with an AP according to an embodiment.

FIG. 2A illustrates a wireless communication system that provides a network of direct communication with an external electronic device and/or wireless communication with an AP according to an embodiment. FIG. 2B illustrates a wireless communication system that provides a network of direct communication with an external electronic device and/or wireless communication with an AP according to an embodiment. FIG. 2C illustrates a wireless communication system that provides a network of direct communication with an external electronic device and/or wireless communication with an AP according to an embodiment. According to an embodiment, the electronic device 200 and/or the external electronic device 210 in FIGS. 2A to 2C may be at least partially similar to the electronic device 101 in FIG. 1, or may further include other embodiments of an electronic device.

With reference to FIGS. 2A, 2B and 2C, network environments 200A to 200C may include at least one of direct communication based on Wi-Fi Direct or wireless communication with a network infrastructure equipment based on Wi-Fi (e.g., AP, hotspot, or router).

With reference to FIG. 2A, the electronic device 200 may access the AP1 220, which is a network infrastructure equipment, based on Wi-Fi. The electronic device 200 may transmit and/or receive data to and/or from the AP1 220 through a first channel 241 allocated by the AP1 220. The electronic device 200 may receive channel information about the first channel 241 from the AP1 220. The channel information may include at least one of a frequency band, a bandwidth, or identification information of the channel. When the electronic device 200 is connected to the AP1 220, the electronic device 200 may configure the capability of the electronic device 200 related to the first channel 241. This capability may include information that can be supported by the electronic device 200 for Wi-Fi communication with the AP1 220.

The electronic device 200 may directly communicate with the external electronic device 210 based on Wi-Fi Direct. The electronic device 200 may transmit and/or receive data to and/or from the external electronic device 210 through a second channel 243 configured by a group owner. The group owner may include a main device controlling direct communication among the electronic device 200 and the external electronic device 210, which perform direct communication. When the external electronic device 210 is the group owner, the electronic device 200 may receive (or exchange) channel information of the second channel 243 from the external electronic device 210. For example, upon establishing direct communication with the external electronic device 210, the electronic device 200 may configure the capability of the electronic device 200 related to the second channel 243. This capability may be associated with the quality of content that can be supported by the electronic device 200 for direct communication with the external electronic device 210, and may include at least one of the values corresponding to one or more resolutions, one or more frame rates, one or more video formats, one or more audio formats, or one or more codecs, which can be supported by the electronic device 200.

The electronic device 200 may communicate with the AP1 220 and/or the external electronic device 210 based on the first channel 241 and/or the second channel 243. When the first channel 241 and the second channel 243 are identical, the electronic device 200 may transmit and/or receive data to and/or from the external electronic device 210 and/or the AP1 220 through the same channel. When the first channel 241 and the second channel 243 are different, the electronic device 200 may determine whether it operates in a real simultaneous dual band (RSDB) mode based on the first channel 241 and the second channel 243.

For example, upon determining operation in the RSDB mode, the electronic device 200 may transmit and/or receive data to and/or from the AP1 220 and the external electronic device 210 through the first channel 241 and the second channel 243. The electronic device 200 may transmit and/or receive data to and/or from the external electronic device 210 and the AP1 220 substantially concurrently based on the RSDB mode. In another example, upon determining that it is not operating in the RSDB mode, the electronic device 200 may reset (or set) variables related to direct communication with the external electronic device 210. The variables related to direct communication may be associated with the quality of content that is to be shared with the external electronic device 210 through direct communication with the external electronic device 210 and may include at least one of the values corresponding to resolutions, frame rates, video formats, audio formats, or codecs. The RSDB mode may indicate an operation mode or at least one instruction that allows the electronic device 200 to transmit or receive data to or from the AP1 200 and to transmit or receive data to or from the external electronic device 210 substantially concurrently.

With reference to FIG. 2B, the external electronic device 210 may access the AP1 220, which is a network infrastructure equipment, based on Wi-Fi. The external electronic device 210 may transmit and/or receive data to and/or from the AP1 220 through a third channel 245 allocated by the AP1 220. The external electronic device 210 may receive channel information about the third channel 245 from the AP1 220.

The external electronic device 210 may communicate with the electronic device 200 and/or the AP1 220 based on the second channel 243 and/or the third channel 245. When the second channel 243 and the third channel 245 are identical, the external electronic device 210 may transmit and/or receive data to and/or from the electronic device 200 and/or the AP1 220 through the same channel. When the second channel 243 and the third channel 245 are different, the external electronic device 210 may determine whether it operates in the RSDB mode based on the second channel 243 and the third channel 245. For example, upon determining operation in the RSDB mode, the external electronic device 210 may transmit and/or receive data to and/or from the electronic device 200 and the AP1 220 through the second channel 243 and the third channel 245. The external electronic device 210 may transmit or receive data with the electronic device 200 and transmit or receive data with the AP1 220 substantially concurrently based on the RSDB mode. In another example, upon determining that it is not operating in the RSDB mode, the external electronic device 210 may reset (or set) variables related to direct communication with the electronic device 200.

With reference to FIG. 2C, the external electronic device 210 may access the AP2 240, which is a network infrastructure equipment, based on Wi-Fi. The external electronic device 210 may transmit and/or receive data to and/or from the AP2 240 through a fourth channel 247 allocated by the AP2 240. The external electronic device 210 may receive channel information about the fourth channel 247 from the AP2 240.

The external electronic device 210 may communicate with the electronic device 200 and/or the AP2 240 based on the second channel 243 and/or the fourth channel 247. When the second channel 243 and the fourth channel 247 are identical, the external electronic device 210 may transmit and/or receive data to and/or from the electronic device 200 and/or the AP2 240 through the same channel. When the second channel 243 and the fourth channel 247 are different, the external electronic device 210 may determine whether it operates in the RSDB mode based on the second channel 243 and the fourth channel 247. For example, upon determining that it operates in the RSDB mode, the external electronic device 210 may transmit and/or receive data to and/or from the electronic device 200 and the AP2 240 through the second channel 243 and the fourth channel 247. The external electronic device 210 may transmit or receive data with the electronic device 200 and transmit or receive data with the AP2 240 substantially concurrently based on the RSDB mode. In another example, upon determining that it is not operating in the RSDB mode, the external electronic device 210 may reset (or set) variables related to direct communication with the electronic device 200.

Figure 3:
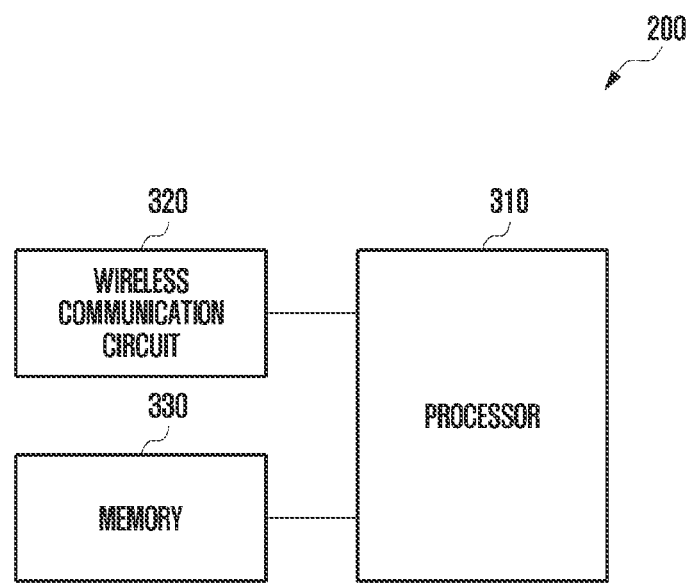
FIG. 3 illustrates an electronic device supporting direct communication with an external electronic device and wireless communication with an AP according to an embodiment.

FIG. 3 illustrates an electronic device supporting direct communication with an external electronic device and wireless communication with an AP according to an embodiment. The electronic device 200 of FIG. 3 may be at least partially similar to the electronic device 101 in FIG. 1 or the electronic device 200 in FIGS. 2A to 2C or may further include other embodiments of an electronic device.

With reference to FIG. 3, The electronic device 200 may include a processor 310, a wireless communication circuit 320, and/or a memory 330. According to an embodiment, the processor 310 may be substantially the same as the processor 120 in FIG. 1 or may be included in the processor 120. The wireless communication circuit 320 may be substantially the same as the wireless communication module 192 in FIG. 1, or may be included in the wireless communication module 192. The memory 330 may be substantially the same as the memory 130 in FIG. 1 or may be included in the memory 130.

The wireless communication circuit 320 may support wireless communication based on Wi-Fi. The wireless communication circuit 320 may perform direct communication with an external electronic device 210 based on Wi-Fi Direct. The wireless communication circuit 320 may perform wireless communication with an external device through a wireless connection with a Wi-Fi based AP1 220.

The wireless communication circuit 320 may include a plurality of communication circuits supporting different frequency bands. The wireless communication circuit 320 may include a first communication circuit supporting a first frequency band (e.g., about 2.4 GHz band), and a second communication circuit supporting a second frequency band (e.g., about 5 GHz band) different from the first frequency band. The first communication circuit may communicate with an external device through at least one channel among channels of the first frequency band. The second communication circuit may communicate with an external device through at least one channel among channels of the second frequency band. The wireless communication circuit 320 may support the RSDB mode by using the first communication circuit and the second communication circuit. The wireless communication circuitry 320 may not support the RSDB mode.

The processor 310 may control the wireless communication circuit 320 and/or the memory 330 operably connected thereto. The processor 310 may include an application processor 121 and/or an auxiliary processor 123.

The processor 310 may identify a channel for wireless communication with at least one external electronic device 210 and/or AP1 220 through the wireless communication circuit 320. The processor 310 may identify, through the wireless communication circuit 320, a first channel allocated by an AP for wireless communication with the AP1 220 based on Wi-Fi. The processor 310 may check the channel information about the first channel received through the wireless communication circuit 320 from the AP. The processor 310 may identify, through the wireless communication circuit 320, a second channel for direct communication with an external electronic device 210. The second channel may be configured by an external electronic device 210 set as a group owner among the electronic devices performing direct communication. For instance, when an external electronic device 210 is the group owner, the processor 310 may check the channel information about the second channel received through the wireless communication circuit 320 from the external electronic device 210.

The processor 310 may control the wireless communication circuit 320 to perform wireless communication with an AP1 220 and direct communication with an external electronic device 210 substantially concurrently. The processor 310 may compare a first channel with the AP1 220 and a second channel with the external electronic device 210. The comparison between the first channel and the second channel may be performed based on at least a portion of the channel information about the first channel and at least a portion of the channel information about the second channel. The processor 310 may compare the two channels based on the frequency band information of the first channel and the frequency band information of the second channel. The comparison between the first channel and the second channel may be performed when wireless communication with the AP1 220 and direct communication with the external electronic device 210 are established through the wireless communication circuit 320 (e.g., at the time of initial connection). In another example, the comparison between the first channel and the second channel may be performed when direct communication with the external electronic device 210 is established through the wireless communication circuit 320 when wireless communication with the AP (e.g., AP1 220 in FIG. 2A) has been established. In another example, the comparison between the first channel and the second channel may be performed when wireless communication with the AP (e.g., AP1 220 in FIG. 2A) is established through the wireless communication circuit 320 when direct communication with the external electronic device 210 has been established. In another example, the comparison between the first channel and the second channel may be performed when the channel with the AP and/or external electronic device is changed when wireless communication with the AP1 220 and direct communication with the external electronic device 210 have been established through the wireless communication circuit 320.

When the first channel (e.g., channel 5765) with the AP1 220 and the second channel (e.g., channel 5765) with the external electronic device 210 are identical, the processor 310 may control the wireless communication circuit 320 to perform wireless communication with the AP1 220 and/or direct communication with the external electronic device 210 through the same channel. The processor 310 may control the wireless communication circuit 320 to perform, through the same channel, wireless communication with the AP1 220 and/or direct communication with the external electronic device 210 substantially concurrently.

When the first channel with the AP1 220 and the second channel with the external electronic device 210 are different, the processor 310 may determine that simultaneous execution of wireless communication with the AP1 220 using the first channel and direct communication with the external electronic device 210 using the second channel is at least partially restricted. For example, when the first channel with the AP1 220 and the second channel with the external electronic device 210 are different, the processor 310 may determine that simultaneous execution of wireless communication with the AP1 220 using the first channel and direct communication with the external electronic device 210 using the second channel is restricted.

When the first channel with the AP1 220 and the second channel with the external electronic device 210 are different, the processor 310 may determine whether the electronic device 200 operates in the RSDB mode in relation to the first channel and the second channel. When the wireless communication circuit 320 does not support the RSDB mode, the processor 310 may determine that the electronic device 200 does not operate in the RSDB mode. In another example, when the wireless communication circuit 320 supports the RSDB mode but the first channel and the second channel are included in the same frequency band (e.g., about 2.4 GHz band or about 5 GHz band), the processor 310 may determine that the electronic device 200 does not operate in the RSDB mode. In another example, when the wireless communication circuit 320 supports the RSDB mode and the first channel and the second channel are included in different frequency bands (e.g., about 2.4 GHz band and about 5 GHz band), the processor 310 may determine that the electronic device 200 operates in the RSDB mode.

Upon determining that the electronic device 200 operates in the RSDB mode, the processor 310 may control the wireless communication circuit 320 to perform wireless communication with the AP1 220 and direct communication with the external electronic device 210 through the first channel and the second channel. Wireless communication with the AP1 220 using the first channel and direct communication with the external electronic device 210 using the second channel may be performed substantially concurrently based on the RSDB mode.

Upon determining that the electronic device 200 does not operate in the RSDB mode, the processor 310 may determine that simultaneous execution of wireless communication with the AP1 220 using the first channel and direct communication with the external electronic device 210 using the second channel is at least partially restricted.

Upon determining that simultaneous execution of wireless communication with the AP1 220 and direct communication with the external electronic device 210 is at least partially restricted, the processor 310 may reset (or set) variables related to direct communication with the external electronic device. Upon determining that simultaneous execution of wireless communication with the AP1 220 and direct communication with the external electronic device 210 is at least partially restricted, the processor 310 may reconfigure the capability of the electronic device 200 related to direct communication with the external electronic device 210. The processor 310 may reconfigure the capability of the electronic device 200 related to direct communication with the external electronic device 210 to include information about at least one relatively low frame rate among a plurality of frame rates that can be supported for direct communication with the external electronic device 210. The processor 310 may control the wireless communication circuit 320 to transmit information about the reconfigured capability of the electronic device 200 to the external electronic device 210. The capability of the electronic device 200 may be associated with the quality of content that can be supported by the electronic device 200 for direct communication with the external electronic device 210 and may include at least one of the values corresponding to one or more resolutions, one or more frame rates, one or more video formats, one or more audio formats, or one or more codecs, which can be supported by the electronic device 200. The information about the reconfigured capability of the electronic device 200 may include at least some of the capabilities of the electronic device 200.

Upon determining that simultaneous execution of wireless communication with the AP1 220 and direct communication with the external electronic device 210 is at least partially restricted, the processor 310 may control the wireless communication circuit 320 to transmit information about dual channel usage to the external electronic device 210. The information about dual channel usage may include information indicating at least partial restriction of simultaneous performance of wireless communication with the AP1 220 and direct communication with the external electronic device 210 (e.g., flag or Boolean information indicating restriction), and/or information about the capability of the electronic device 200 related to direct communication with the external electronic device 210.

In response to the information about the reconfigured capability of the electronic device 200 or the information about dual channel usage, the processor 310 may receive information about variables (or reset variables) related to direct communication with the external electronic device 210 from the external electronic device 210 through the wireless communication circuit 320. For example, based on the information about the variables related to direct communication received from the external electronic device 210, the processor 310 may control the wireless communication circuit 320 to perform direct communication with the external electronic device 210. The information about the variables related to direct communication may include at least some of values corresponding to the variables related to direct communication set (or reset) by the external electronic device 210. The variables related to direct communication set (or reset) by the external electronic device 210 are associated with the quality of content for direct communication with the electronic device 200 set (or reset) by the external electronic device 210 based on the capability (or reconfigured capability) of the electronic device 200, and may include at least one of the values corresponding to the resolution, frame rate, video format, audio format, and/or codec of the content to be shared through direct communication.

The memory 330 may store various data used by at least one component of the electronic device 200 (e.g., processor 310 or wireless communication circuit 320). The data may include a first channel with the AP, a second channel with the external electronic device, a capability of the electronic device 200 related to direct communication, and/or variables related to direct communication. The data may be stored as a data table or a file in the memory 330. The memory 330 may store instructions that can be executed through the processor 310.

The external electronic device 210 may set or reset variables related to direct communication with the electronic device 200. Similar to the electronic device 200 of FIG. 3, the external electronic device 210 may include a processor, a wireless communication circuit, and/or a memory. The variables related to direct communication with the electronic device 200 may be set or reset by the processor 310 of the external electronic device 210.

When establishing direct communication with the electronic device 200 (e.g., at the time of initial connection), the external electronic device 210 may set variables related to direct communication with the electronic device 200 based on the capability (or reconfigured capability) of the electronic device 200 provided from the electronic device 200.

Upon receiving information about the reconfigured capability of the electronic device 200 from the electronic device 200 during direct communication with the electronic device 200, the external electronic device 210 may reset the variables related to direct communication with the electronic device 200 based on the reconfigured capability of the electronic device 200 provided from the electronic device 200.

Upon receiving information about dual channel usage from the electronic device 200 during direct communication with the electronic device 200, the external electronic device 210 may reset the variables related to direct communication with the electronic device 200 based on the capability of the electronic device 200. The capability of the electronic device 200 may be received from the electronic device 200 at the time of establishing direct communication with the electronic device 200 or together with the information about dual channel usage.

As shown in FIG. 2B, upon determining that simultaneous execution of wireless communication with the AP1 220 and direct communication with the electronic device 200 is at least partially restricted based on the second channel 243 with the electronic device 200 and the third channel 245 with the AP1 220, the external electronic device 210 may reset the variables related to direct communication with the electronic device 200 based on the capability (or reconfigured capability) of the electronic device 200. When the second channel 243 with the electronic device 200 and the third channel 245 with the AP1 220 are different, the external electronic device 210 may determine that simultaneous execution of wireless communication with the AP1 220 and direct communication with the electronic device 200 is at least partially restricted. In another example, when it is determined that the second channel 243 with the electronic device 200 and the third channel 245 with the AP1 220 are different and the external electronic device 210 does not operate in the RSDB mode, the external electronic device 210 may determine that simultaneous execution of wireless communication with the AP1 220 and direct communication with the electronic device 200 is at least partially restricted.

As shown in FIG. 2C, when it is determined that simultaneous execution of wireless communication with the AP2 240 and direct communication with the electronic device 200 is at least partially restricted based on the second channel 243 with the electronic device 200 and the fourth channel 247 with the AP2 240, the external electronic device 210 may reset the variables related to direct communication with the electronic device 200 based on the capability (or reconfigured capability) of the electronic device 200. When the second channel 243 with the electronic device 200 and the fourth channel 244 with the AP2 240 are different, the external electronic device 210 may determine that simultaneous execution of wireless communication with the AP2 240 and direct communication with the electronic device 200 is at least partially restricted. In another example, when it is determined that the second channel 243 with the electronic device 200 and the fourth channel 247 with the AP2 240 are different and the external electronic device 210 does not operate in the RSDB mode, the external electronic device 210 may determine that simultaneous execution of wireless communication with the AP2 240 and direct communication with the electronic device 200 is at least partially restricted.

According to an embodiment, an electronic device (e.g., electronic device 101 in FIG. 1, electronic device 200 in FIG. 2A, 2B or 2C, or electronic device 200 in FIG. 3) may include a wireless communication circuit (e.g., wireless communication module 192 in FIG. 1 or wireless communication circuit 320 in FIG. 3) and a processor (e.g., processor 120 in FIG. 1 or processor 310 in FIG. 3) operably connected to the wireless communication circuit, wherein the processor may be configured to identify a first channel (e.g., first channel 241 in FIG. 2A, 2B or 2C) for Wi-Fi connection with an AP1 and a second channel (e.g., second channel 243 in FIG. 2A, 2B or 2C) for Wi-Fi Direct connection with an external electronic device (e.g., external electronic device 210 in FIG. 2A, 2B or 2C), reconfigure the capability of the electronic device related to communication using Wi-Fi Direct with the external electronic device when the first channel and the second channel are different, and transmit information about the reconfigured capability of the electronic device to the external electronic device through the wireless communication circuit.

The processor may configure a first capability of the electronic device related to the first channel, configure a second capability of the electronic device related to the second channel, and reconfigure the second capability of the electronic device when the first channel and the second channel are different, wherein the second capability of the electronic device may include at least one piece of information corresponding to the frame rate, resolution, video format, audio format, and codec that can be supported by the electronic device for communication using Wi-Fi Direct with the external electronic device.

When the first channel and the second channel are identical, the processor may be configured to determine to maintain the second capability of the electronic device.

The processor may be configured to determine whether to operate in an RSDB mode in relation to the AP1 and the external electronic device when the first channel and the second channel are different, and reconfigure the capability of the electronic device related to direct communication with the external electronic device upon determining not to operate in the RSDB mode.

The processor may be configured to determine whether to operate in the RSDB mode based on a frequency band corresponding to the first channel and a frequency band corresponding to the second channel.

Upon determining that it operates in the RSDB mode, the processor may be configured to determine to maintain the capability of the electronic device related to communication using Wi-Fi Direct with the external electronic device.

The processor may be configured to receive information about at least one variable related to direct communication from the external electronic device through the wireless communication circuit, and receive information about content through direct communication with the external electronic device based on the information about at least one variable, wherein the at least one variable related to direct communication may include at least one piece of information corresponding to the frame rate, resolution, video format, audio format, or codec associated with the content for communication using Wi-Fi Direct with the external electronic device.

The electronic device may further include a display module, and the processor may be configured to control the display module to output information about the content received from the external electronic device.

The processor may be configured to identify the first channel for Wi-Fi connection with the AP and the second channel for Wi-Fi Direct connection with the external electronic device during initial connection with the AP and/or the external electronic device.

The processor may be configured to identify the first channel for Wi-Fi connection with the AP and the second channel for Wi-Fi Direct connection with the external electronic device in response to a channel change with the AP and/or the external electronic device while communication with the AP and direct communication with the external electronic device are being performed.

Figure 4:
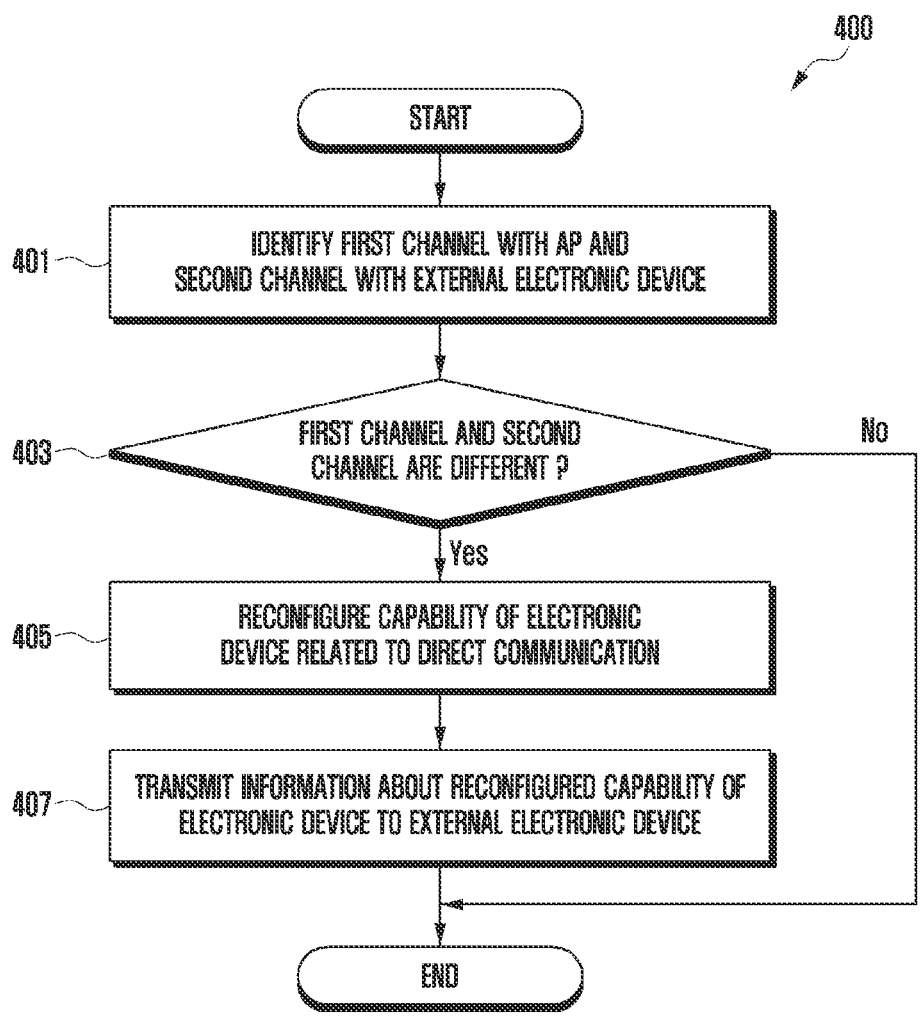
FIG. 4 illustrates the electronic device to reconfigure the capability of the electronic device related to direct communication with an external electronic device according to an embodiment.

FIG. 4 illustrates the electronic device to reconfigure the capability of the electronic device related to direct communication with an external electronic device according to an embodiment. The operations may or may not be performed in sequence, the order of operations may be changed, and at least two operations may be performed in parallel. For example, the electronic device in FIG. 4 may be the electronic device 101 in FIG. 1, the electronic device 200 in FIGS. 2A to 2C, or the electronic device 200 in FIG. 3.

In operation 401, the electronic device may identify a first channel for wireless communication with an AP1 220 and a second channel for direct communication with an external electronic device 210. The first channel may be allocated by the AP1 being a network infrastructure equipment. The second channel may be configured by a main device set as a group owner among the electronic devices performing direct communication.

In operation 403, the electronic device may determine whether the first channel for wireless communication with the AP1 220 and the second channel for direct communication with the external electronic device 210 are different based on the frequency band information of the first channel and the frequency band information of the second channel.

If the first channel for wireless communication with the AP1 220 and the second channel for direct communication with the external electronic device 210 are identical (e.g., "no" in operation 403), the electronic device may terminate the embodiment for reconfiguring the capability of the electronic device related to direct communication. When the first channel (e.g., channel 5765) with the AP1 220 and the second channel (e.g., channel 5745) with the external electronic device 210 are identical, the processor 310 may control the wireless communication circuit 320 to perform wireless communication with the AP1 220 and/or direct communication with the external electronic device 210 through the same channel.

If the first channel for wireless communication with the AP1 220 and the second channel for direct communication with the external electronic device 210 are different (e.g., "yes" in operation 403), in operation 405, the electronic device may reconfigure the capability of the electronic device related to direct communication with the external electronic device. When the first channel 5765 with the AP1 220 and the second channel 5745 with the external electronic device 210 are different, the processor 310 may determine that simultaneous execution of wireless communication with the AP1 220 and direct communication with the external electronic device 210 is at least partially restricted. In this case, the processor 310 may reconfigure the capability of the electronic device 200 to reset the variables related to direct communication so as to continuously maintain direct communication with the external electronic device 210. When the electronic device 200 supports multiple video formats (e.g., 1080p@60 fps and 1080p@30 fps), the processor 310 may reconfigure the capability of the electronic device 200 to support a video format (e.g., 1080p@30 fps) corresponding to at least one relatively low frame rate. The video format may include a resolution (e.g., 1080p) and a frame rate (e.g., 60 fps and/or 30 fps) of image content.

In operation 407, the electronic device may transmit information about the reconfigured capability of the electronic device to the external electronic device 210.

When wireless communication with the AP1 220 and direct communication with the external electronic device 210 are established through the wireless communication circuit 320 (e.g., at the time of initial connection), as in operations 401 to 407 of FIG. 4, The electronic device 200 may reconfigure the capability of the electronic device 200 related to direct communication based on the first channel 241 with the AP1 220 and the second channel 243 with the external electronic device 210.

When direct communication with the external electronic device 210 is established through the wireless communication circuit 320 when wireless communication with the AP1 220 has been established, as in operations 401 to 407 of FIG. 4, the electronic device 200 may reconfigure the capability of the electronic device 200 related to direct communication based on the first channel 241 with the AP1 220 and the second channel 243 with the external electronic device 210.

When wireless communication with the AP1 220 is established through the wireless communication circuit 320 when direct communication with the external electronic device 210 has been established, as in operations 401 to 407 of FIG. 4, the electronic device 200 may reconfigure the capability of the electronic device 200 related to direct communication based on the first channel 241 with the AP1 220 and the second channel 243 with the external electronic device 210.

When the channel with the AP1 220 and/or the external electronic device 210 is changed when wireless communication with the AP1 220 and direct communication with the external electronic device 210 have been established, as in operations 401 to 407 of FIG. 4, the electronic device 200 may reconfigure the capability of the electronic device 200 related to direct communication based on the first channel 241 with the AP1 220 and the second channel 243 with the external electronic device 210.

Figure 5:
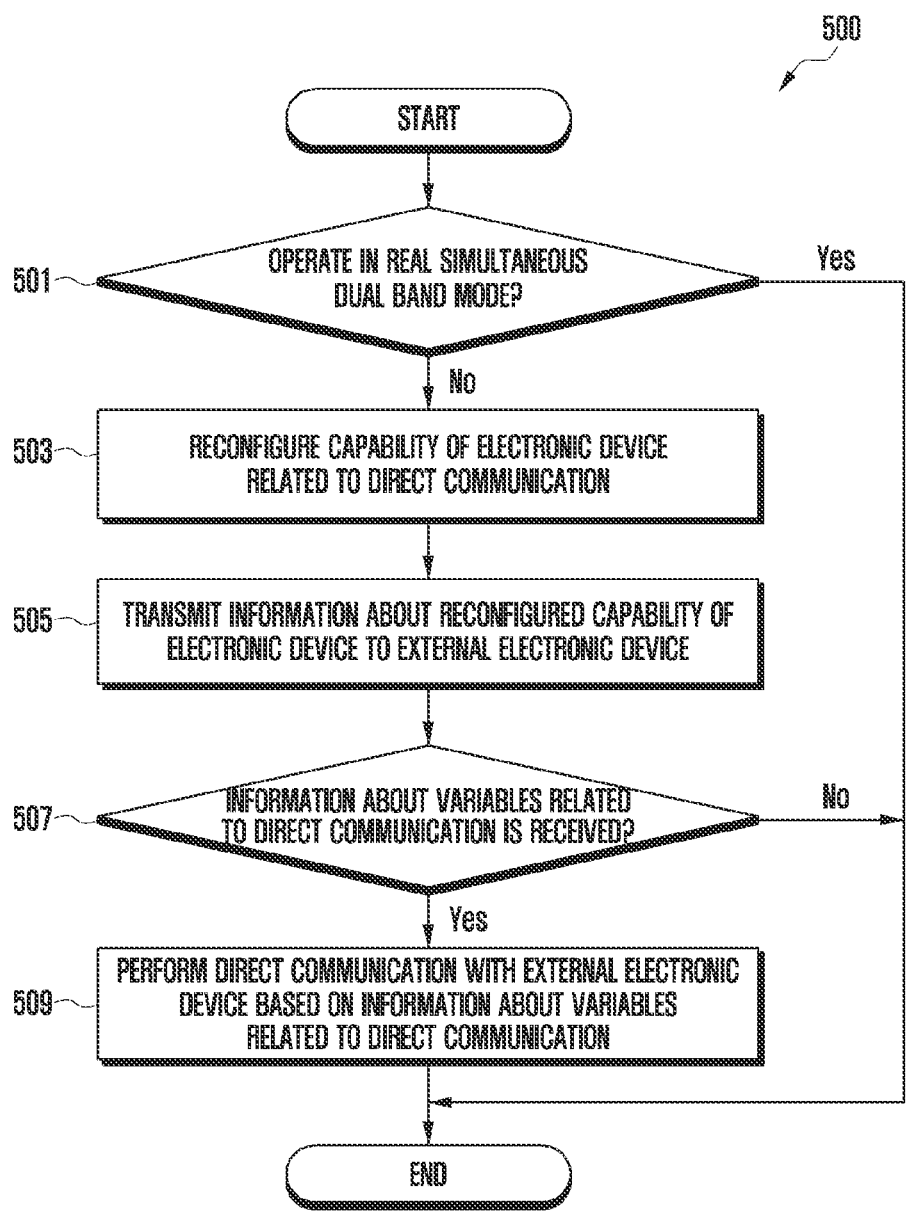
FIG. 5 illustrates a method of the electronic device for resetting variables related to direct communication with an external electronic device according to an embodiment.

FIG. 5 illustrates a method of the electronic device for resetting variables related to direct communication with an external electronic device according to an embodiment. The operation of FIG. 5 may be details of operations 405 and 407 in FIG. 4. The operations may or may not be performed in sequence, the order of the operations may be changed, and at least two operations may be performed in parallel. For example, the electronic device in FIG. 5 may be the electronic device 101 in FIG. 1, the electronic device 200 in FIGS. 2A to 2C, or the electronic device 200 in FIG. 3.

With reference to FIG. 5, if the first channel for wireless communication with the AP1 220 and the second channel for direct communication with the external electronic device 210 are different (e.g., "yes" in operation 403 in FIG. 4), in operation 501, the electronic device may determine whether it operates in the RSDB mode. When the wireless communication circuit 320 does not support the RSDB mode, the processor 310 may determine that the external electronic device does not operate in the RSDB mode. When the wireless communication circuit 320 supports the RSDB mode but the first channel and the second channel are included in the same frequency band (e.g., about 2.4 GHz band or about 5 GHz band), the processor 310 may determine that the external electronic device does not operate in the RSDB mode. When the wireless communication circuit 320 supports the RSDB mode and the first channel and the second channel are included in different frequency bands (e.g., about 2.4 GHz band and about 5 GHz band), the processor 310 may determine that the external electronic device operates in the RSDB mode.

When it determines that it operates in the RSDB mode (e.g., "yes" in operation 501), the electronic device may terminate the embodiment for resetting variables related to direct communication with the external electronic device. When the wireless communication circuit 320 supports the RSDB mode and the first channel (e.g., channel 5765) with the AP1 220 and the second channel (e.g., channel 2412) with the external electronic device 210 are included in different frequency bands, the processor 310 may determine that the external electronic device operates in the RSDB mode. For example, based on the RSDB mode, the processor 310 may control the wireless communication circuit 320 to perform wireless communication with the AP1 220 and direct communication with the external electronic device 210 substantially concurrently.

When it determines that is does not operate in the RSDB mode (e.g., "no" in operation 501), in operation 503, the electronic device may reconfigure the capability of the electronic device related to direct communication with the external electronic device. When the electronic device 200 supports a plurality of audio formats (e.g., audio codecs), the processor 310 may reconfigure the capability of the electronic device 200 to support only at least one audio format (e.g., audio codec) of relatively low sound quality.

In operation 505, the electronic device may transmit information about the reconfigured capability of the electronic device to the external electronic device 210.

In operation 507, the electronic device may determine whether information about variables related to direct communication is received from the external electronic device as a response to the information about the reconfigured capability of the electronic device.

If information about variables related to direct communication is not received from the external electronic device (e.g., "no" in operation 507), the electronic device may terminate the embodiment for resetting variables related to direct communication with the external electronic device. When information about variables related to direct communication is not received until a specified time elapses after the information about the reconfigured capability of the electronic device 200 is transmitted, the processor 310 may control the wireless communication circuit 320 to re-transmit the information about the reconfigured capability of the electronic device 200 to the external electronic device 210. When the number of times of transmission of the information about the reconfigured capability of the electronic device 200 exceeds a specified reference number of times, the processor 310 may determine that resetting of variables related to direct communication is restricted.

If information about variables related to direct communication is received from the external electronic device (e.g., "yes" in operation 507), in operation 509, the electronic device may perform direct communication with the external electronic device based on the information about variables related to direct communication received from the external electronic device. When content (e.g., image content and/or audio content) is received from the external electronic device 210 based on the information about variables related to direct communication, the processor 310 may output the corresponding content to the outside through a display module and/or an audio output device. The information about variables related to direct communication received from the external electronic device 210 may be associated with the quality of content for direct communication with the electronic device 200 configured (or reconfigured) in the external electronic device 210 based on the capability (or reconfigured capability) of the electronic device 200, and may include at least one of variables corresponding to the resolution, frame rate, video format, audio format, or codec of the content to be shared through direct communication.

Upon determining that simultaneous execution of wireless communication with the AP1 220 and direct communication with the external electronic device 210 is at least partially restricted, the electronic device 200 may reconfigure the capability of the electronic device 200 related to direct communication. Accordingly, the electronic device 200 can stably maintain direct communication with the external electronic device 210 by relatively decreasing the quality of the content received from the external electronic device 210.

Figure 6:
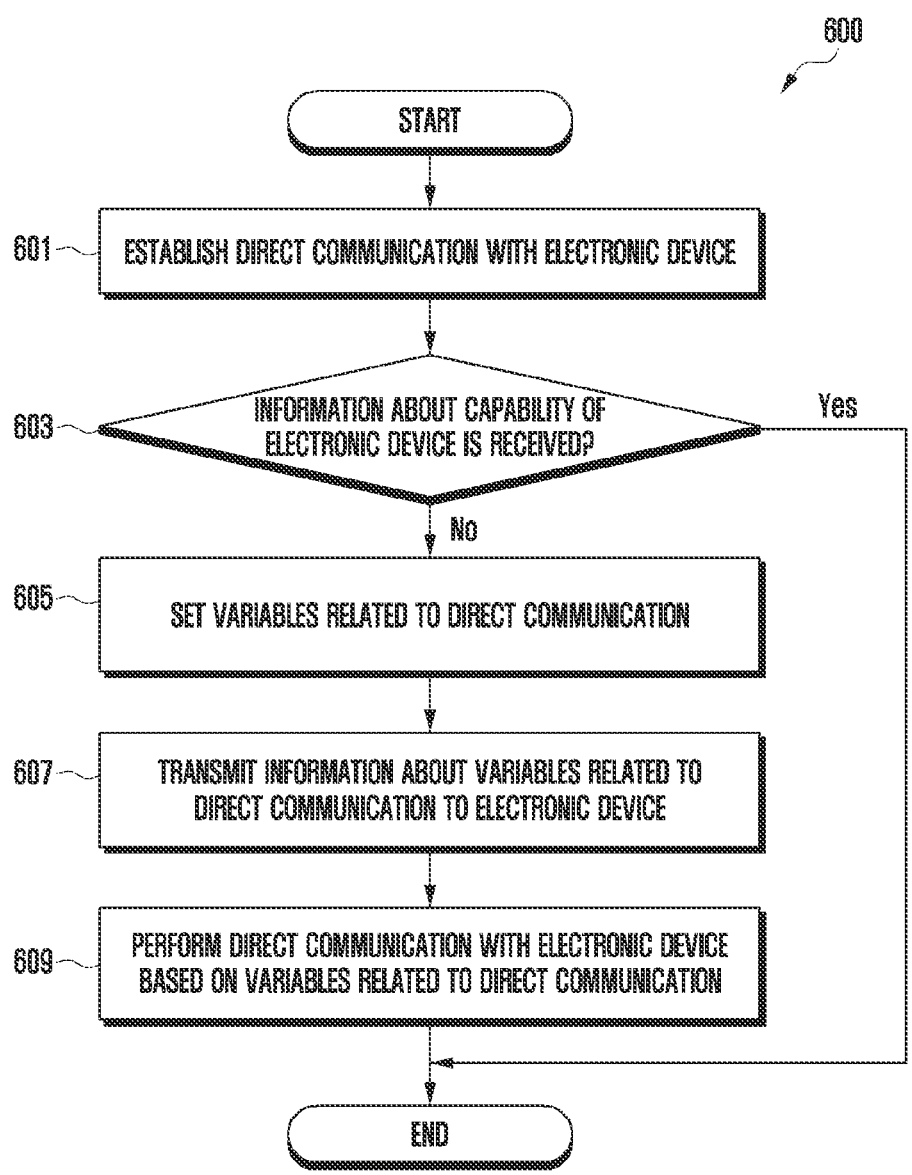
FIG. 6 illustrates a method of the external electronic device for setting variables related to direct communication with the electronic device according to an embodiment.

FIG. 6 illustrates a method of the external electronic device for setting variables related to direct communication with the electronic device according to an embodiment. The operations of FIG. 6 are details of the operations in FIGS. 4 and 5. The operations may or may not be performed in sequence, may be changed, and at least two may be performed in parallel.

In operation 601, the external electronic device may establish direct communication using Wi-Fi Direct with the electronic device. The external electronic device 210 may establish a communication channel for direct communication with the electronic device 200.

In operation 603, the external electronic device may determine whether information about the capability of the electronic device is received from the electronic device with which direct communication is established.

When information about the capability of the electronic device is not received (e.g., "no" in operation 603), the external electronic device may terminate the embodiment for setting variables related to direct communication.

When information about the capability of the electronic device is received (e.g., "yes" in operation 603), in operation 605, the external electronic device may set (or reset) variables related to direct communication with the electronic device based on the information about the capability of the electronic device received from the electronic device. The external electronic device 210 may set variables related to direct communication with the electronic device 200 based on information about the capability of the electronic device 200 received from the electronic device 200 during the initial connection of direct communication with the electronic device 200. The external electronic device 210 may also reset the variables related to direct communication with the electronic device 200 based on information about the capability of the electronic device 200 received from the electronic device 200 during direct communication with the electronic device 200.

In operation 607, the external electronic device may transmit information about the variables related to direct communication with the electronic device to the electronic device. The external electronic device may transmit information about the variables related to direct communication with the electronic device 200 to the electronic device 200 as a response to the information about the capability of the electronic device 200 received from the electronic device 200.

In operation 609, the external electronic device may perform direct communication with the electronic device based on the variables related to direct communication with the electronic device. The external electronic device 210 may generate content (e.g., image content and/or audio content) corresponding to the variables (e.g., video format and/or audio format) related to direct communication and transmit it to the electronic device 200.

Figure 7:
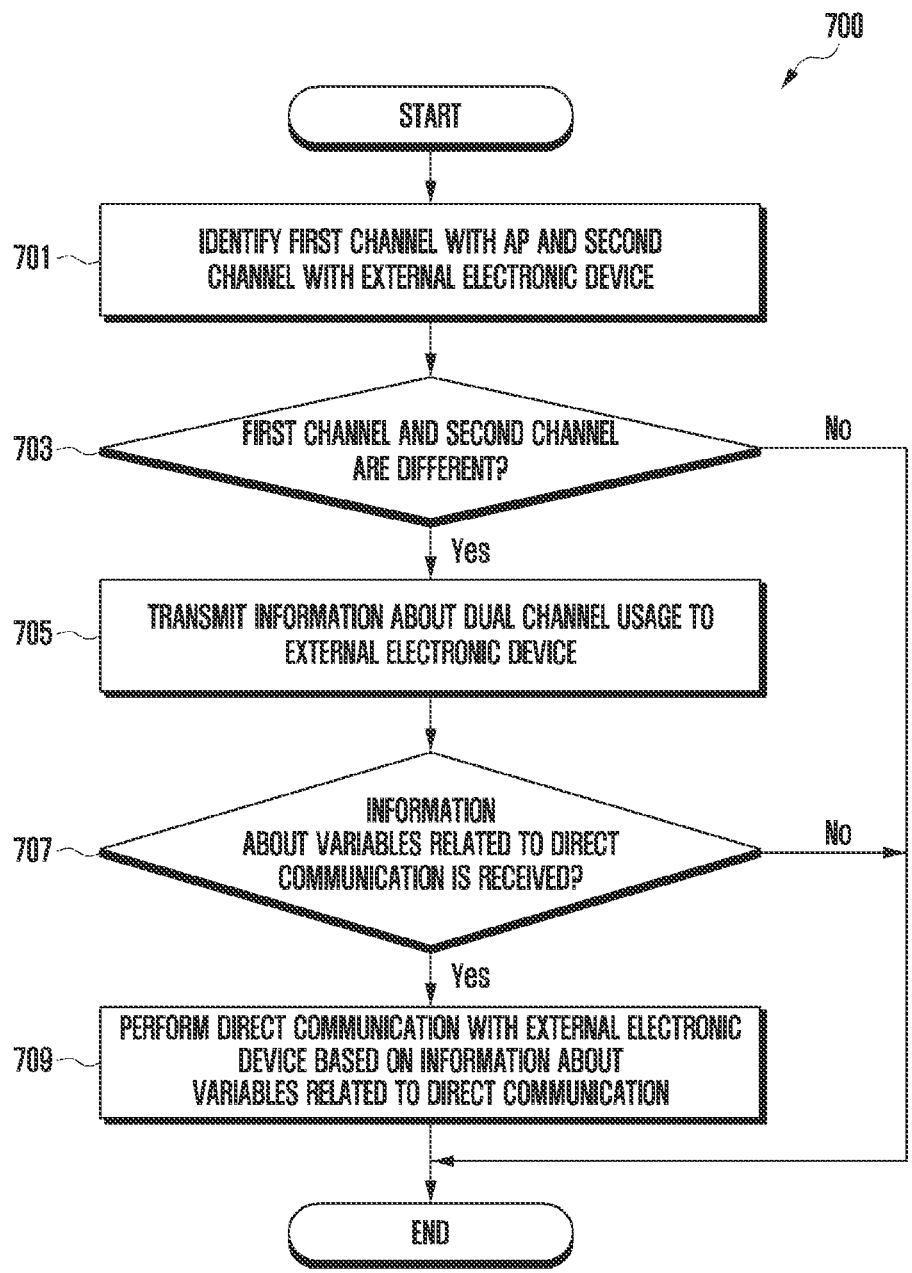
FIG. 7 illustrates the electronic device to transmit information related to dual channel usage to the external electronic device according to an embodiment.

FIG. 7 illustrates the electronic device to transmit information related to dual channel usage to the external electronic device according to an embodiment. The operations may or may not be performed in sequence, the order of the operations may be changed, and at least two operations may be performed in parallel. For example, the electronic device in FIG. 7 may be the electronic device 101 in FIG. 1, the electronic device 200 in FIGS. 2A to 2C, or the electronic device 200 in FIG. 3.

In operation 701, the electronic device may identify a first channel for wireless communication with an AP1 220 and a second channel for direct communication with an external electronic device 210. The processor 301 may receive channel information about the first channel from the AP1 220 through the wireless communication circuit 320. The processor 301 may receive, through the wireless communication circuit 320, channel information about the second channel from the external electronic device 210 set as a group owner for direct communication.

In operation 703, the electronic device may determine whether the first channel for wireless communication with the AP1 220 and the second channel for direct communication with the external electronic device 210 are different based on the frequency band information of the first channel and the frequency band information of the second channel.

If the first channel for wireless communication with the AP1 220 and the second channel for direct communication with the external electronic device 210 are identical (e.g., "no" in operation 703), the electronic device may terminate the embodiment for transmitting information about dual channel usage to the external electronic device. When the first channel (e.g., channel 5765) with the AP1 220 and the second channel (e.g., channel 5765) with the external electronic device 210 are identical, the processor 310 may control the wireless communication circuit 320 to perform wireless communication with the AP1 220 and/or direct communication with the external electronic device 210 through the same channel (e.g., channel 5765).

If the first channel for wireless communication with the AP1 220 and the second channel for direct communication with the external electronic device 210 are different (e.g., "yes" in operation 703), in operation 705, the electronic device may transmit information about dual channel usage to the external electronic device. When the first channel for wireless communication with the AP1 220 and the second channel for direct communication with the external electronic device 210 are different, the processor 310 may determine that simultaneous execution of wireless communication with the AP1 220 and direct communication with the external electronic device 210 is at least partially restricted. Accordingly, the processor 310 may control the wireless communication circuit 320 to transmit the information about dual channel usage to the external electronic device 210.

In operation 707, the electronic device may determine whether information about variables related to direct communication is received from the external electronic device 210 in response to the information about dual channel usage.

If information about variables related to direct communication is not received from the external electronic device 210 (e.g., "no" in operation 707), the electronic device may terminate the embodiment for transmitting information about dual channel usage to the external electronic device.

If information about variables related to direct communication is received from the external electronic device 210 (e.g., "yes" in operation 707), in operation 709, the electronic device may perform direct communication with the external electronic device based on the information about variables related to direct communication received from the external electronic device. When content (e.g., image content and/or audio content) corresponding to the variable information (e.g., video format information and/or audio format information) related to direct communication is received from the external electronic device 210, the processor 310 may output the corresponding content to the outside through a display module and/or an audio output device.

If the first channel for wireless communication with the AP1 220 and the second channel for direct communication with the external electronic device 210, the electronic device may determine whether the electronic device 200 operates in the RSDB mode. Upon determining that it does not operates in the RSDB mode, the electronic device may determine that simultaneous execution of wireless communication with the AP1 220 and direct communication with the external electronic device 210 is at least partially restricted. In this case, the electronic device may control the wireless communication circuit 320 to transmit information about dual channel usage to the external electronic device 210 as in operation 705.

Upon determining that it operates in the RSDB mode, the electronic device may determine that it is possible to perform both wireless communication with the AP1 220 and direct communication with the external electronic device 210 substantially concurrently. In this case, the electronic device may perform wireless communication with the AP1 220 using the first channel and direct communication with the external electronic device 210 using the second channel substantially concurrently based on the RSDB mode.

Figure 8:
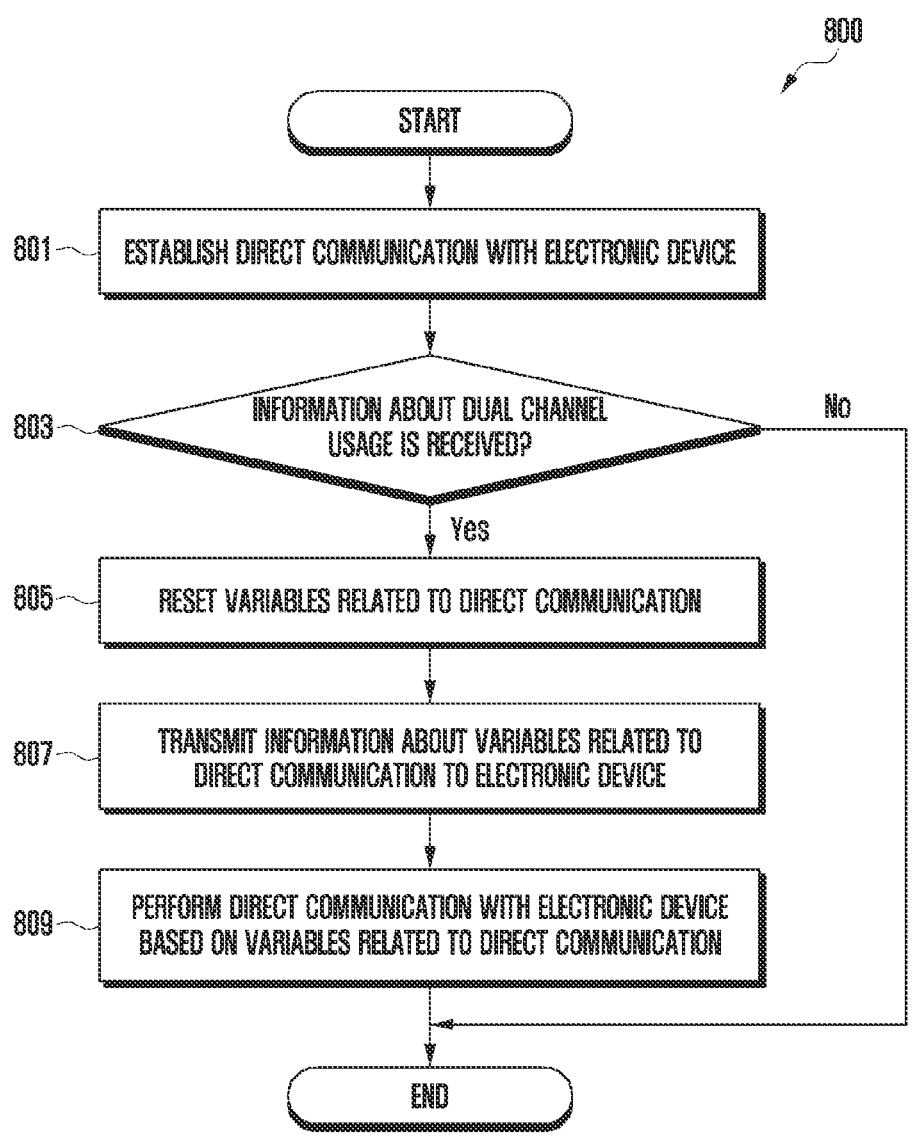
FIG. 8 illustrates the external electronic device to reset variables related to direct communication with the electronic device based on information about dual channel usage according to an embodiment.

FIG. 8 illustrates the external electronic device to reset variables related to direct communication with the electronic device based on information about dual channel usage according to an embodiment. The operations of FIG. 8 may be detailed operations of those in FIG. 7. The operations may or may not be performed in sequence, the order of the operations may be changed, and at least two operations may be performed in parallel. For example, the external electronic device in FIG. 8 may be the electronic device 101 in FIG. 1 or the external electronic device 210 in FIGS. 2A to 2C.

In operation 801, the external electronic device may establish direct communication using Wi-Fi Direct with the electronic device. The external electronic device 210 may establish a communication channel for direct communication with the electronic device 200. The external electronic device 210 may set variables related to direct communication with the electronic device 200 through negotiation with the electronic device 200. The external electronic device 210 may perform direct communication with the electronic device 200 based on the variables related to direct communication.

In operation 803, the external electronic device may determine whether information about dual channel usage is received from the electronic device in direct communication. The information about dual channel usage may include information indicating that simultaneous execution of wireless communication with the AP1 220 and direct communication with the external electronic device 210 is at least partially restricted in the electronic device 200, and/or information about the capability of the electronic device 200 related to direct communication with the external electronic device 210.

If information about dual channel usage is not received (e.g., "no" in operation 803), the external electronic device may terminate the embodiment for resetting the variables related to direct communication. The external electronic device 210 may perform direct communication with the electronic device 200 based on the variables related to direct communication determined in operation 801.

If information about dual channel usage is received (e.g., "yes" in operation 803), in operation 805, the external electronic device may reset the variables related to direct communication with the electronic device 200 based on the information about the capability of the electronic device 200 received from the electronic device 200 during the initial connection of direct communication with the electronic device 200. The external electronic device 210 may reset the variables related to direct communication with the electronic device 200 based on the information about the capability of the electronic device 200 included in the information about dual channel usage. For example, among multiple video formats supported by the electronic device 200 (e.g., 1080p@60 fps and 1080p@30 fps), the external electronic device 210 may select a video format (e.g., 1080p@30 fps) corresponding to at least one relatively low frame rate. The external electronic device 210 may reset the variables related to direct communication with the electronic device 200 based on a video format corresponding to at least one relatively low frame rate.

In operation 807, the external electronic device may transmit information about the variables related to direct communication with the electronic device to the electronic device as a response to the information about dual channel usage received from the electronic device 200.

In operation 809, the external electronic device may perform direct communication with the electronic device based on the variables related to direct communication with the electronic device. The external electronic device 210 may generate content (e.g., image content and/or audio content) corresponding to the reset variables (e.g., a value corresponding to the video format and/or a value corresponding to the audio format) related to direct communication and transmit the content to the electronic device 200.

Figure 9:
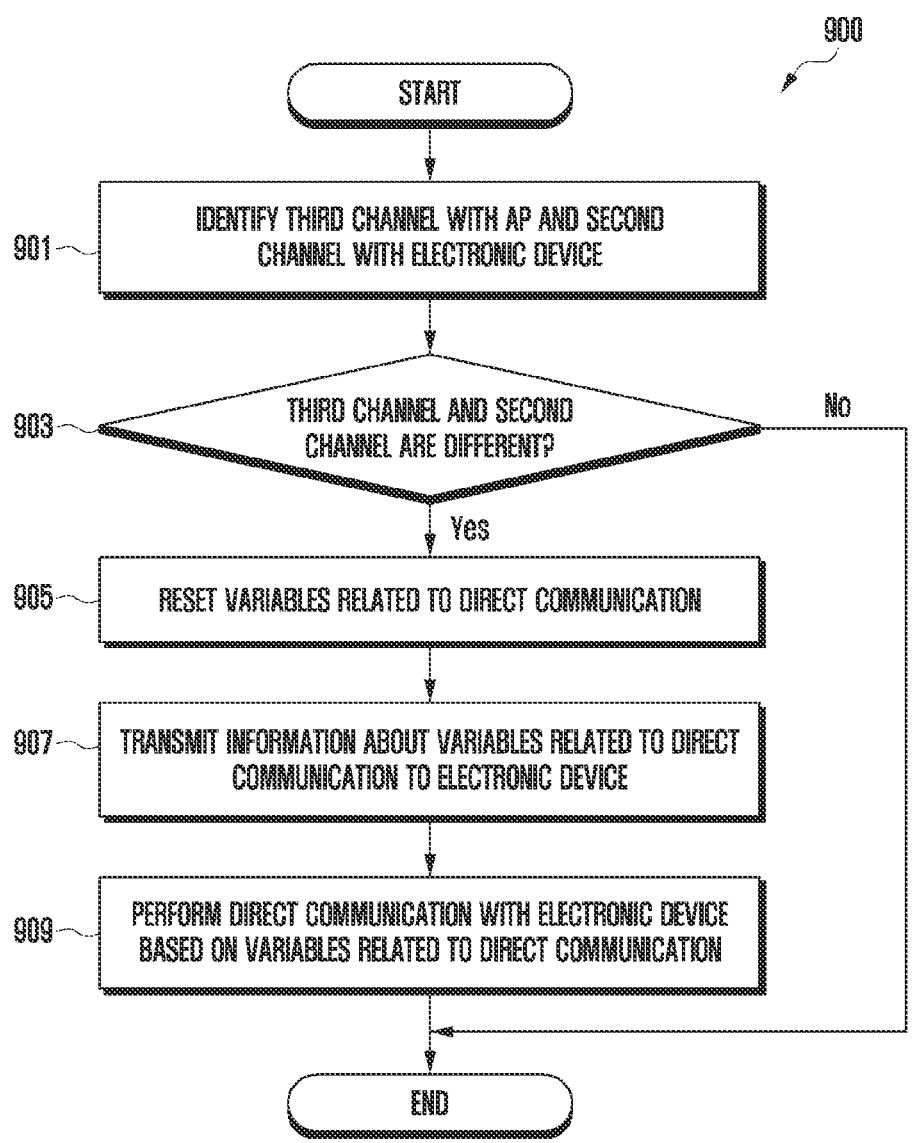
FIG. 9 illustrates the external electronic device to reset variables related to direct communication with the electronic device according to an embodiment.

FIG. 9 illustrates the external electronic device to reset variables related to direct communication with the electronic device according to an embodiment. The operations may or may not be performed in sequence, the order of the operations may be changed, and at least two operations may be performed in parallel. For example, the external electronic device in FIG. 9 may be the electronic device 101 in FIG. 1 or the external electronic device 210 in FIGS. 2A to 2C.

In operation 901, the external electronic device may identify a third channel for wireless communication with the AP1 and a second channel for direct communication with the electronic device. The external electronic device 210 may identify the third channel allocated by the AP1 220 for wireless communication. The external electronic device 210 may identify the second channel configured by the group owner for direct communication with the electronic device 200.

In operation 903, the external electronic device may determine whether the third channel for wireless communication with the AP1 and the second channel for direct communication with the electronic device are different. The external electronic device may determine whether the second channel and the third channel are different based on the frequency band information of the second channel and the frequency band information of the third channel.

If the third channel for wireless communication with the AP1 and the second channel for direct communication with the electronic device are identical (e.g., "no" in operation 903), the external electronic device may terminate the embodiment for resetting variables related to direct communication with the electronic device. When the third channel for wireless communication with the AP1 220 and the second channel for direct communication with the electronic device 200 are identical, the external electronic device 210 may perform wireless communication with the AP1 220 and/or direct communication with the electronic device 200 through the same channel.

If the third channel for wireless communication with the AP1 220 and the second channel for direct communication with the electronic device are different (e.g., "yes" in operation 903), in operation 905, the external electronic device may reset the variables related to direct communication with the electronic device 200 based on the information about the capability of the electronic device 200 received from the electronic device 200 during the initial connection of direct communication with the electronic device 200. For example, among plural video formats supported by the electronic device 200 (e.g., 1080p@60 fps, 1080p@30 fps, and 720p@30 fps), the external electronic device 210 may select a video format (e.g., 720p@30 fps) corresponding to at least one relatively low frame rate. The external electronic device 210 may reset the variables related to direct communication with the electronic device 200 based on a video format corresponding to at least one relatively low frame rate.

In operation 907, the external electronic device may transmit information about the variables related to direct communication with the electronic device to the electronic device.

In operation 909, the external electronic device may perform direct communication with the electronic device based on the variables related to direct communication with the electronic device.

When the third channel for wireless communication with the AP1 220 and the second channel for direct communication with the electronic device 200 are different, the external electronic device 210 may determine whether the external electronic device 210 operates in the RSDB mode. Upon determining that it does not operate in the RSDB mode, the external electronic device 210 may determine that simultaneous execution of wireless communication with the AP1 220 and direct communication with the electronic device 200 is at least partially restricted. In this case, the external electronic device 210 may reset the variables related to direct communication with the electronic device 200.

Upon determining that it operates in the RSDB mode, the external electronic device 210 may determine that wireless communication with the AP1 220 and direct communication with the electronic device 200 can be performed substantially concurrently. In this case, the external electronic device 210 may perform wireless communication with the AP1 220 using the third channel and direct communication with the electronic device 200 using the second channel substantially concurrently based on the RSDB mode.

According to an embodiment, a method of an electronic device (e.g., electronic device 101 in FIG. 1, electronic device 200 in FIG. 2A, 2B or 2C, or electronic device 200 in FIG. 3) may include identifying a first channel (e.g., first channel 241 in FIG. 2A, 2B or 2C) for Wi-Fi connection with an AP1 (e.g., AP1 220 in FIG. 2A, 2B or 2C) and a second channel (e.g., second channel 243 in FIG. 2A, 2B or 2C) for Wi-Fi Direct connection with an external electronic device (e.g., external electronic device 210 in FIG. 2A, 2B or 2C); reconfiguring the capability of the electronic device related to communication using Wi-Fi Direct with the external electronic device when the first channel and the second channel are different, and transmitting information about the reconfigured capability of the electronic device to the external electronic device.

Identifying a first channel and a second channel may include identifying the first channel for Wi-Fi connection with the AP and the second channel for Wi-Fi Direct connection with the external electronic device during initial connection with the AP and/or the external electronic device.

Identifying a first channel and a second channel may include identifying the first channel for Wi-Fi connection with the AP and the second channel for Wi-Fi Direct connection with the external electronic device in response to a channel change with the AP and/or the external electronic device while communication with the AP and direct communication with the external electronic device are being performed.

The method may further include configuring a first capability of the electronic device related to the first channel; and configuring a second capability of the electronic device related to the second channel, wherein reconfiguring the capability of the electronic device may include reconfiguring the second capability of the electronic device when the first channel and the second channel are different, and wherein the second capability of the electronic device may include at least one piece of information corresponding to the frame rate, resolution, video format, audio format, and codec that can be supported by the electronic device for communication using Wi-Fi Direct with the external electronic device.

The method may further include determining to maintain the second capability of the electronic device when the first channel and the second channel are identical.

Reconfiguring the capability of the electronic device may include determining whether to operate in an RSDB mode in relation to the AP and the external electronic device when the first channel and the second channel are different and reconfiguring the capability of the electronic device related to direct communication with the external electronic device upon determining not to operate in the RSDB mode.

Determining whether to operate in the RSDB mode may include determining whether to operate in the RSDB mode based on a frequency band corresponding to the first channel and a frequency band corresponding to the second channel.

Upon determining to operate in the RSDB mode, the method may further include determining to maintain the capability of the electronic device related to communication using Wi-Fi Direct with the external electronic device.

The method may further include receiving information about at least one variable related to direct communication from the external electronic device and receiving information about content through direct communication with the external electronic device based on the information about at least one variable.

The method may further include outputting the information about content received from the external electronic device to a display module of the electronic device.

The embodiments of the disclosure disclosed above are only provided as specific examples to easily explain the contents of the disclosure for understanding and are not intended to limit the scope of the embodiments of the disclosure. Therefore, it should be construed that all changes or modifications derived from the subject matter of the disclosure in addition to the embodiments disclosed herein are included in the scope of embodiments of the disclosure.

According to various embodiments of the disclosure, when a first channel for wireless connection with an access point (AP) based on Wi-Fi is different from a second channel for direct communication with an external electronic device based on Wi-Fi Direct, the electronic device may set or reset variables related to direct communication with the external electronic device (e.g., values corresponding to resolutions, frame rates, video formats, audio formats, and/or codecs) to thereby continuously provide a low-latency service through direct communication with the external electronic device.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. An electronic device, comprising:
a wireless communication circuitry;
a processor operably connected to the wireless communication circuitry; and
memory storing instructions which, when executed by the processor, cause the electronic device to:
identify a first channel for communication with an access point (AP) based on Wi-Fi and a second channel for direct communication with an external electronic device based on Wi-Fi direct;
reconfigure a capability of the electronic device related to direct communication with the external electronic device when the first channel and the second channel are different, wherein the capability of the electronic device includes information associated with a quality of content supported by the electronic device for direct communication with the external electronic device based on the Wi-Fi direct; and transmit, to the external electronic device via the wireless communication circuitry, information related to the reconfigured capability of the electronic device.

2. The electronic device of claim 1,
wherein the instructions when executed by the processor, further cause the electronic device to configure a first capability of the electronic device related to the first channel, configure a second capability of the electronic device related to the second channel, and reconfigure the second capability of the electronic device when the first channel and the second channel are different; and
wherein the second capability of the electronic device includes at least one of the information corresponding to a frame rate, resolution, video format, audio format, and codec that can be supported by the electronic device for direct communication with the external electronic device based on the Wi-Fi direct.

3. The electronic device of claim 2,
wherein the instructions when executed by the processor, further cause the electronic device to maintain the second capability of the electronic device when the first channel and the second channel are identical.

4. The electronic device of claim 1, wherein the instructions when executed by the processor, further cause the electronic device to:
determine whether to operate in a real simultaneous dual band (RSDB) mode in relation to the AP and the external electronic device when the first channel and the second channel are different; and
reconfigure the capability of the electronic device related to direct communication with the external electronic device when determining not to operate in the RSDB mode.

5. The electronic device of claim 4,
wherein the instructions when executed by the processor, further cause the electronic device to determine whether to operate in the RSDB mode based on a frequency band corresponding to the first channel and a frequency band corresponding to the second channel.

6. The electronic device of claim 4,
wherein the instructions when executed by the processor, further cause the electronic device to determine to maintain the capability of the electronic device related to direct communication with the external electronic device when determining to operate in the RSDB mode.

7. The electronic device of claim 1,
wherein the instructions when executed by the processor, further cause the electronic device to receive, from the external electronic device via the wireless communication circuitry, information related to at least one variable related to direct communication, and receive information related to content through direct communication with the external electronic device based on the information related to at least one variable; and
wherein the at least one variable related to direct communication includes at least one of information corresponding to a frame rate, resolution, video format, audio format, and codec associated with content for direct communication with the external electronic device.

8. The electronic device of claim 7, further comprising a display, and
wherein the instructions when executed by the processor, further cause the electronic device to output, via the display, the information related to the content received from the external electronic device.

9. The electronic device of claim 1,
wherein the instructions when executed by the processor, further cause the electronic device to identify the first channel for communication with the AP based on the Wi-Fi and the second channel for direct communication with the external electronic device based on the Wi-Fi direct during an initial connection with the AP and/or the external electronic device.

10. The electronic device of claim 1,
wherein the instructions when executed by the processor, further cause the electronic device to identify the first channel for communication with the AP and the second channel for direct communication with the external electronic device in response to a channel change with the AP and/or the external electronic device while communication with the AP and direct communication with the external electronic device are being performed.

11. A method of an electronic device, the method comprising:
identifying a first channel for communication with an access point (AP) based on Wi-Fi and a second channel for direct communication with an external electronic device based on Wi-Fi direct;
reconfiguring a capability of the electronic device related to direct communication with the external electronic device when the first channel and the second channel are different, wherein the capability of the electronic device includes information associated with a quality of content supported by the electronic device for direct communication with the external electronic device based on the Wi-Fi direct; and
transmitting, to the external electronic device, information related to the reconfigured capability of the electronic device.

12. The method of claim 11,
wherein the first channel is identified for communication with the AP and the second channel is identified for direct communication with the external electronic device during an initial connection with the AP and/or the external electronic device.

13. The method of claim 11,
wherein the first channel is identified for communication with the AP and the second channel is identified for direct communication with the external electronic device in response to a channel change with the AP and/or the external electronic device while communication with the AP and direct communication with the external electronic device are being performed.

14. The method of claim 11, further comprising:
configuring a first capability of the electronic device related to the first channel; and
configuring a second capability of the electronic device related to the second channel,
wherein reconfiguring a capability of the electronic device comprises reconfiguring the second capability of the electronic device when the first channel and the second channel are different, and wherein the second capability of the electronic device includes at least one of the information corresponding to a frame rate, resolution, video format, audio format, and codec that can be supported by the electronic device for direct communication with the external electronic device based on the Wi-Fi direct.

15. The method of claim 14, further comprising:
determining to maintain the second capability of the electronic device when the first channel and the second channel are identical.

16. The method of claim 11, wherein reconfiguring a capability of the electronic device comprises:
determining whether to operate in a real simultaneous dual band (RSDB) mode in relation to the AP and the external electronic device when the first channel and the second channel are different; and
reconfiguring the capability of the electronic device related to direct communication with the external electronic device when determining not to operate in the RSDB mode.

17. The method of claim 16,
wherein it is determined whether to operate in the RSDB mode based on a frequency band corresponding to the first channel and a frequency band corresponding to the second channel.

18. The method of claim 16, further comprising:
determining to maintain the capability of the electronic device related to direct communication with the external electronic device when determining to operate in the RSDB mode.

19. The method of claim 11, further comprising:
receiving information related to at least one variable related to direct communication from the external electronic device; and
receiving information related to content through direct communication with the external electronic device based on the information related to at least one variable.

20. The method of claim 19, further comprising:
outputting the information related to content received from the external electronic device to a display of the electronic device.

* * * * *